US008396493B2

(12) United States Patent  (10) Patent No.: US 8,396,493 B2
Boerries et al.                (45) Date of Patent:    Mar. 12, 2013

(54) NETWORK-BASED ARCHIVING FOR THREADED MOBILE TEXT MESSAGES

(75) Inventors: Marco Boerries, Los Altos Hills, CA (US); Gustav Söderström, Bromma (SE)

(73) Assignee: Yahoo! Inc., Sunnyvale, CA (US)

( * ) Notice: Subject to any disclaimer, the term of this patent is extended or adjusted under 35 U.S.C. 154(b) by 991 days.

(21) Appl. No.: 11/924,074

(22) Filed: Oct. 25, 2007

(65) Prior Publication Data

US 2008/0207236 A1    Aug. 28, 2008

Related U.S. Application Data

(60) Provisional application No. 60/892,022, filed on Feb. 28, 2007.

(51) Int. Cl.
*H04W 4/00* (2009.01)
(52) U.S. Cl. .... 455/466; 455/557; 455/41.2; 455/412.1; 455/414.1
(58) Field of Classification Search .................. 455/466, 455/557, 41.2, 412.1, 414.1
See application file for complete search history.

(56) References Cited

U.S. PATENT DOCUMENTS

| 5,493,692 | A | 2/1996 | Theimer et al. |
| 6,718,551 | B1 | 4/2004 | Swix et al. |
| 6,834,195 | B2 | 12/2004 | Brandenberg et al. |
| 7,072,941 | B2 * | 7/2006 | Griffin et al. ................. 709/204 |
| 7,188,153 | B2 | 3/2007 | Lunt et al. |
| 7,389,324 | B2 | 6/2008 | Masonis et al. |
| 7,487,912 | B2 * | 2/2009 | Seifert et al. ................. 235/380 |
| 7,643,831 | B2 * | 1/2010 | Wilson ........................ 455/445 |
| 7,685,631 | B1 | 3/2010 | Paya et al. |
| 7,797,256 | B2 | 9/2010 | Zuckerberg et al. |
| 8,176,131 | B2 | 5/2012 | Masonis et al. |
| 2001/0013051 | A1 | 8/2001 | Nakada et al. |
| 2001/0039191 | A1 | 11/2001 | Maierhofer |
| 2002/0129282 | A1 | 9/2002 | Hopkins |

(Continued)

FOREIGN PATENT DOCUMENTS

| KR | 1020020016436 | 3/2002 |
| KR | 1020040084541 | 10/2004 |

(Continued)

OTHER PUBLICATIONS

International Search Report and Written Opinion for International Patent Application No. PCT/US2008/053597 mailed Aug. 5, 2008.

(Continued)

*Primary Examiner* — Nghi H Ly
(74) *Attorney, Agent, or Firm* — Frommer Lawrence & Haug LLP; Jamie L. Wiegand

(57) ABSTRACT

A network device, method, and mobile device are directed towards enabling a mobile device user to archive a text message threaded conversation with another conversation participant. text messages sent from the mobile device may be replicated by a server component, whether the text message is a reply message or an incoming message. The replicated text message may then be sent to an identified personal computing device's network-based messaging archive. In one embodiment, the messaging archive may be an outbox archive for text messages. As described, a text message being sent to the mobile device from the other conversation participant may also be replicated and archived in a network-based inbox archive for text messages on the identified personal computing device. In one embodiment, the archived text messages may be displayed to the user on the personal computing devices as threaded conversations.

17 Claims, 4 Drawing Sheets

U.S. PATENT DOCUMENTS

| | | |
|---|---|---|
| 2003/0110234 A1 | 6/2003 | Egli et al. |
| 2005/0050143 A1 | 3/2005 | Gusler et al. |
| 2005/0055409 A1 | 3/2005 | Alsarraf et al. |
| 2005/0149621 A1 | 7/2005 | Kirkland et al. |
| 2005/0174975 A1 | 8/2005 | Mgrdechian et al. |
| 2005/0176433 A1 | 8/2005 | Wilson |
| 2005/0197846 A1 | 9/2005 | Pezaris et al. |
| 2005/0210106 A1 | 9/2005 | Cunningham |
| 2006/0031334 A1 | 2/2006 | Kim |
| 2006/0031337 A1 | 2/2006 | Kim |
| 2006/0085419 A1 | 4/2006 | Rosen |
| 2006/0161599 A1 | 7/2006 | Rosen |
| 2006/0248584 A1 | 11/2006 | Kelly et al. |
| 2007/0260523 A1 | 11/2007 | Schadt et al. |
| 2008/0046976 A1 | 2/2008 | Zuckerberg |
| 2008/0077595 A1 | 3/2008 | Leebow |
| 2008/0134052 A1 | 6/2008 | Davis et al. |
| 2011/0289153 A1 | 11/2011 | Hull et al. |
| 2012/0191797 A1 | 7/2012 | Masonis et al. |

FOREIGN PATENT DOCUMENTS

| | | |
|---|---|---|
| TW | 200300894 A | 6/2003 |
| TW | 200427273 A | 12/2004 |
| WO | 2005069166 | 7/2005 |
| WO | 2005114970 A2 | 12/2005 |

OTHER PUBLICATIONS

International Preliminary Report on Patentability for International Patent Application No. PCT/US2008/053597 mailed Sep. 11, 2009.

Official Communication for Taiwanese Patent Application No. 097105714 mailed Jan. 10, 2012.

SearchSecurity; "Email Spoofing"; Jul. 22, 2002; SearchSecurity. com; pp. 1-2.

Kitterman, S.; "How Web-Generated Emailers Can Avoid Looking Like Forgers"; Nov. 12, 2006; www.openspf.org; pp. 1-2; http://www.openspf.org/?action=browse&id=Best_Practices/Webgenerated&revision=22; Dec. 6, 2010.

Federated search, http://en.wikipedia.org/wiki/Federated_search; May 15, 2007; 3 pages.

Crowley, D. P. et al., U.S. Appl. No. 60/570,410, filed May 12, 2004 (18 pages).

Official Communication in U.S. Appl. No. 11/866,601 mailed Sep. 13, 2012.

Official Communication in U.S. Appl. No. 11/866,601 mailed Feb. 21, 2012.

Official Communication in U.S. Appl. No. 11/866,601 mailed Aug. 4, 2011.

Official Communication in U.S. Appl. No. 11/866,601 mailed Apr. 26, 2011.

Official Communication in U.S. Appl. No. 11/866,601 mailed Dec. 8, 2010.

\* cited by examiner

NETWORK-BASED ARCHIVING FOR THREADED MOBILE TEXT MESSAGES

CROSS-REFERENCE

This utility patent application claims priority to U.S. Provisional Patent Application No. 60/892,022, filed on Feb. 28, 2007, entitled "Network-Based Archiving For Threaded Mobile Text Messages," the benefit of which is claimed under 35 U.S.C. §119, and is further incorporated herein by reference.

TECHNICAL FIELD

The invention relates generally to communications over a network, and more particularly but not exclusively to enabling text threaded conversations from a mobile device to be archived on an identified computer device and displayable as text threaded conversations from network-based messaging archives.

BACKGROUND

In today's computing environment, a user may employ a variety of computing devices. For example, one user may use a desktop personal computer (PC) at a fixed work place, at home, or the like, while another user may use a mobile computing device, such as a cellular telephone, a palm-size PC, or perhaps even a personal data assistant (PDA). Moreover, users may employ a PC one moment and their mobile computing device at some other moment.

Users may further employ a variety of communication modes. For example, users may communicate using email messages, audio messages, Voice over Internet Protocol (VOIP), Short Message Services (SMS), Instant Messaging (IM), or the like. While some of these communication modes provide a history of a conversation between participants, this may not allows be the case. For example, when the user employs their mobile computing device to participate in an SMS conversation, a history of the conversation may not be available to the user, either on the mobile computing device, or another of their computing devices. Thus, it is with respect to these considerations and others that the invention has been made.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding of the invention, reference will be made to the following Detailed Description of the Embodiments, which is to be read in association with the accompanying drawings, wherein.

DETAILED DESCRIPTION

Figure 1:
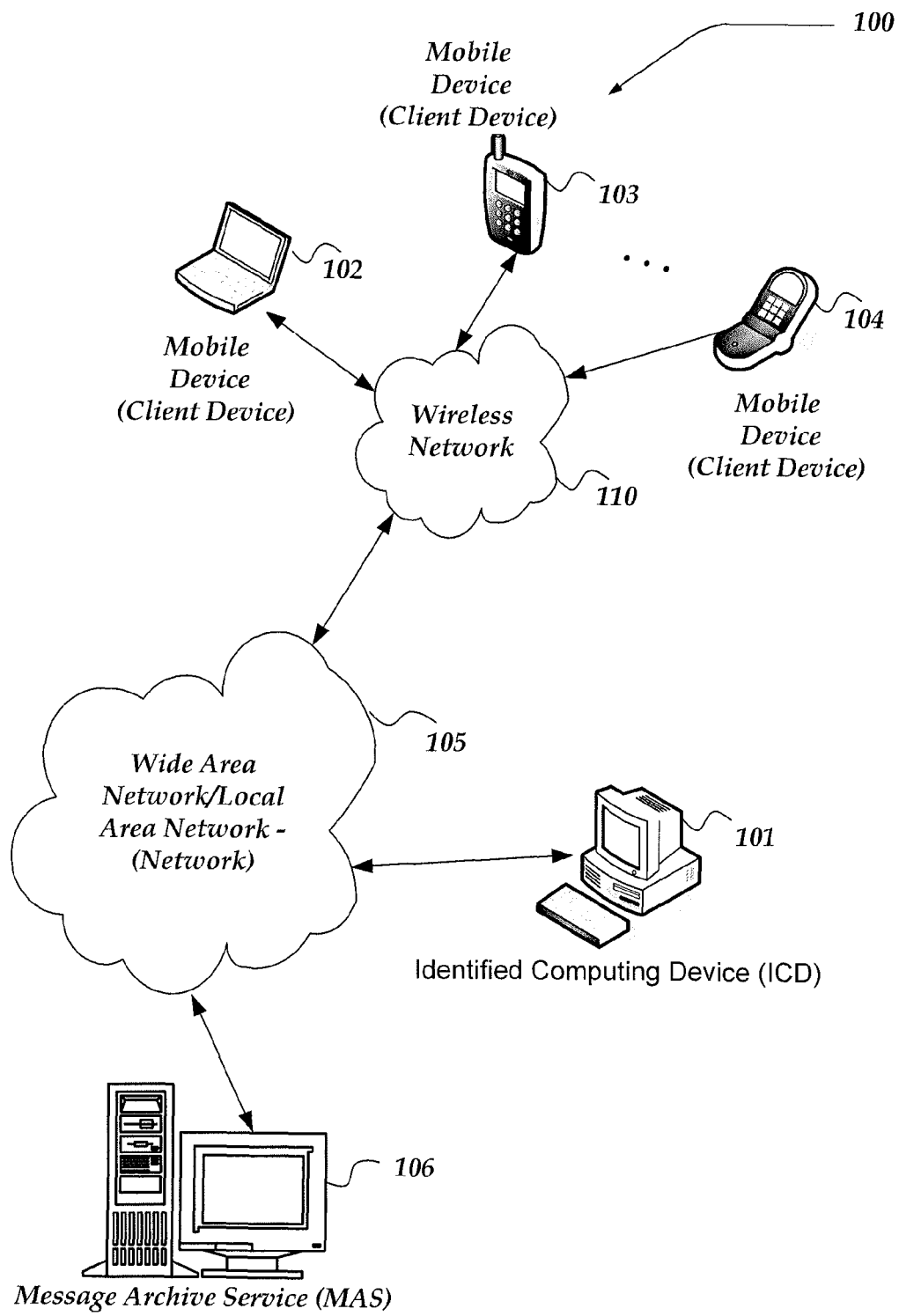
FIG. 1 shows a functional block diagram illustrating one embodiment of an environment.

The invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the invention may be embodied as methods or devices. Accordingly, the invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The term Short Message Service (SMS) refers to a communication mechanism for providing connectionless transfers of limited size messages between networked devices. SMS messages may be cell broadcast services which are periodically delivered short message to a pre-defined set of computing devices in a given area, or point-to-point services which include short messages sent to a specific user. The SMS protocol is described in more detail in International Standard ISO/IEC 21989, available through the International Organization for Standardization (ISO), and which is hereby incorporated herein by reference, as well as such documents as Global System for Mobile Communications (GSM) 03.38 and 04.11. As used herein, SMS refers to all such short message communications, and those derived therefrom.

As used herein, the terms "text messaging," or "text message" refer to SMS messaging, as well as a variety of other limited size message protocols, including, but not limited to, Instant Messaging (IM), Multimedia Messaging Service (MMS) message, or an Enhanced Message Service (EMS) message protocols.

Briefly stated, embodiments are directed towards enabling a first mobile device user to archive an outgoing text message with another conversation participant, by having a copy of the text messages sent to an identified computing device's network-based messaging archive. In one embodiment, the other conversation participant employs a second mobile device; however, the invention is not so limited, and a personal computer may also be used. In one embodiment, text messages sent from the first mobile device are replicated by a server component. In one embodiment, a determination of whether to replicate the text message may be based on an address identifier, such as a phone number, or the like, associated with the outgoing text message. If it is determined that the user has subscribed to network-based archiving based on the phone number, account identifier, or other address identifier, then the outgoing text message may be replicated. The replicated text message may then be sent to the identified computing device's message outbox archive. In one embodiment, the message archive may be a network-based outbox archive for text messages. In another embodiment, the archival location may be configured and arranged for display and/or access of threaded conversations—that is, both incoming messages and outgoing messages. Thus, in one embodiment a single archival location and/or display interface for a user may be provided.

In one embodiment, a text message being sent to the first mobile device from the other conversation participant may also be replicated and archived in a network-based inbox archive for text messages on the identified personal computing device. In one embodiment, the archived text messages may be displayed to the user on the identified computing devices as threaded conversations. In one embodiment, the identified computing device is a personal computer; however, it may also be a specified mobile device, server device, or other network connected device.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")-(network) 105, wireless network 110, Message Archive Service (MAS) 106, mobile devices 102-104, and Identified Computing Device (ICD) 101.

Generally, mobile devices 102-104 may include virtually any computing device capable of receiving and sending a message over a network, such as network 105, wireless network 110, or the like, to and from another computing device, such as MAS 106, each other, or the like. Client devices 102-104 may include portable devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile device, and the like. Client devices 102-104 also may be any computing device that is capable of connecting using a wired or wireless communication medium such as a PDA, POCKET PC, laptop computer, wearable computer, and any other device that is equipped to communicate over a wired and/or wireless communication medium.

Mobile devices 102-104 may also include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 102-104 may also be configured to communicate a message, such as through Short Message Service (SMS), Multimedia Message Service (MMS), instant messaging (IM), internet relay chat (IRC), Mardam-Bey's IRC (mIRC), Jabber, email, or the like, between another computing device, such as MAS 106, each other, or the like. However, embodiments are not limited to these message protocols, and virtually any other message protocol may be employed.

For example, mobile devices 102-104 may also be enabled to communicate an audio message using Voice over Internet Protocol (VOIP), or the like.

Mobile devices 102-104 also may include at least one other client application that is configured to provide information that identifies itself, including a type, capability, name, and the like. In one embodiment, mobile devices 102-104 may uniquely identify themselves through any of a variety of mechanisms, including a phone number, Mobile Identification Number (MIN), an electronic serial number (ESN), or other mobile device identifier. The information may also indicate a content format that the mobile device is enabled to employ. Such information may be provided in a message, or the like, sent to MAS 106, ICD 101, or other computing devices.

Mobile devices 102-104 may further be configured to include a client application that enables the end-user to log into an end-user account that may be managed by another computing device, such as MAS 106, or the like. Such end-user account, for example, may be configured to enable the end-user to receive and/or send email messages, SMS messages, audio messages, or the like. However, in one embodiment, communications with another computing device may also be performed without logging into the end-user account.

One embodiment of ICD 101 is described in more detail below in conjunction with FIG. 2. Briefly, however, ICD 101 may include virtually any computing device capable of connecting to another computing device and receiving and/or sending information. Such devices may include personal computers, multiprocessor systems, microprocessor-based or programmable consumer electronics, network PCs, and the like. However, ICD 101 is not constrained to such devices, and ICD 101 may also include portable devices such as, cellular telephones, smart phones, display pagers, radio frequency (RF) devices, infrared (IR) devices, Personal Digital Assistants (PDAs), handheld computers, wearable computers, tablet computers, integrated devices combining one or more of the preceding devices, and the like.

ICD 101 may include at least one client application that is configured to receive content from another computing device. The client application may include a capability to provide and receive textual content, graphical content, audio content, alerts, messages, and the like. For example, ICD 101 may be configured to communicate a text message, such as through a Short Message Service (SMS), Multimedia Message Service (MMS), instant messaging (IM), internet relay chat (IRC), mIRC, Jabber, and the like, between another computing device. In one embodiment ICD 101 may include a capability to receive text messages and to display the text messages as threaded conversations. In one embodiment, such text messages may be received within a network-based archive, such as a text message outbox, inbox, or the like, as described below.

Wireless network 110 is configured to couple mobile devices 102-104 with network 105. Wireless network 110 may include any of a variety of wireless sub-networks that may further overlay stand-alone ad-hoc networks, and the like, to provide an infrastructure-oriented connection for mobile devices 102-104. Such sub-networks may include mesh networks, Wireless LAN (WLAN) networks, cellular networks, and the like.

Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G) generation radio access for cellular systems, WLAN, Wireless Router (WR) mesh, and the like. Access technologies such as 2G, 3G, and future access networks may enable wide area coverage for mobile devices, such as mobile devices 102-104 with various degrees of mobility. For example, wireless network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like. In essence, wireless network 110 may include virtually any wireless communication mechanism by which information may travel between mobile devices 102-104 and another computing device, network, and the like.

Moreover, one or more components within wireless network 110 may be managed by one or more carrier service providers that are configured to manage various aspects of the communications.

Network 105 is configured to couple MAS 106 and its components with other computing devices, including, ICD 101, and through wireless network 110 to mobile devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between MAS 106, ICD 101, another network, and/or other computing devices.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

One embodiment of MAS 106 is described in more detail below in conjunction with FIG. 3. Briefly, however, MAS 106 may include any computing device capable of connecting to network 105 to enable an examination of text messages for selective archiving. In one embodiment, text messages may be examined to determine if the message is associated with a party that has identified text messages are to be archived. If so, then MAS 106 may replicate the text message and send the replicated text message to an identified computing device's network archive, such as a text message outbox, inbox, or the like. In one embodiment, MAS 106 may employ a process such as described below in conjunction with FIG. 4 to perform at least some of its actions.

Devices that may operate as MAS 106 include personal computers desktop computers, multiprocessor systems, microprocessor-based or programmable consumer electronics, network PCs, servers, network appliance, or the like. In one embodiment, MAS 106 may be configured to operate as a network component within a carrier's text messaging system. Thus, while illustrated outside of network 101 or 105, MAS 106 may also operate within network 105 and/or 101, without departing from the scope of the invention.

Furthermore, although FIG. 1 illustrates MAS 106 as a single computing device, the invention is not so limited. For example, one or more functions of MAS 106 may be distributed across one or more distinct computing devices. For example, managing various messaging activities, including text messages distributions, and/or selective text message archiving may be performed by a plurality of computing devices, without departing from the scope or spirit of the various embodiments.

Illustrative ICD Environment

Figure 2:
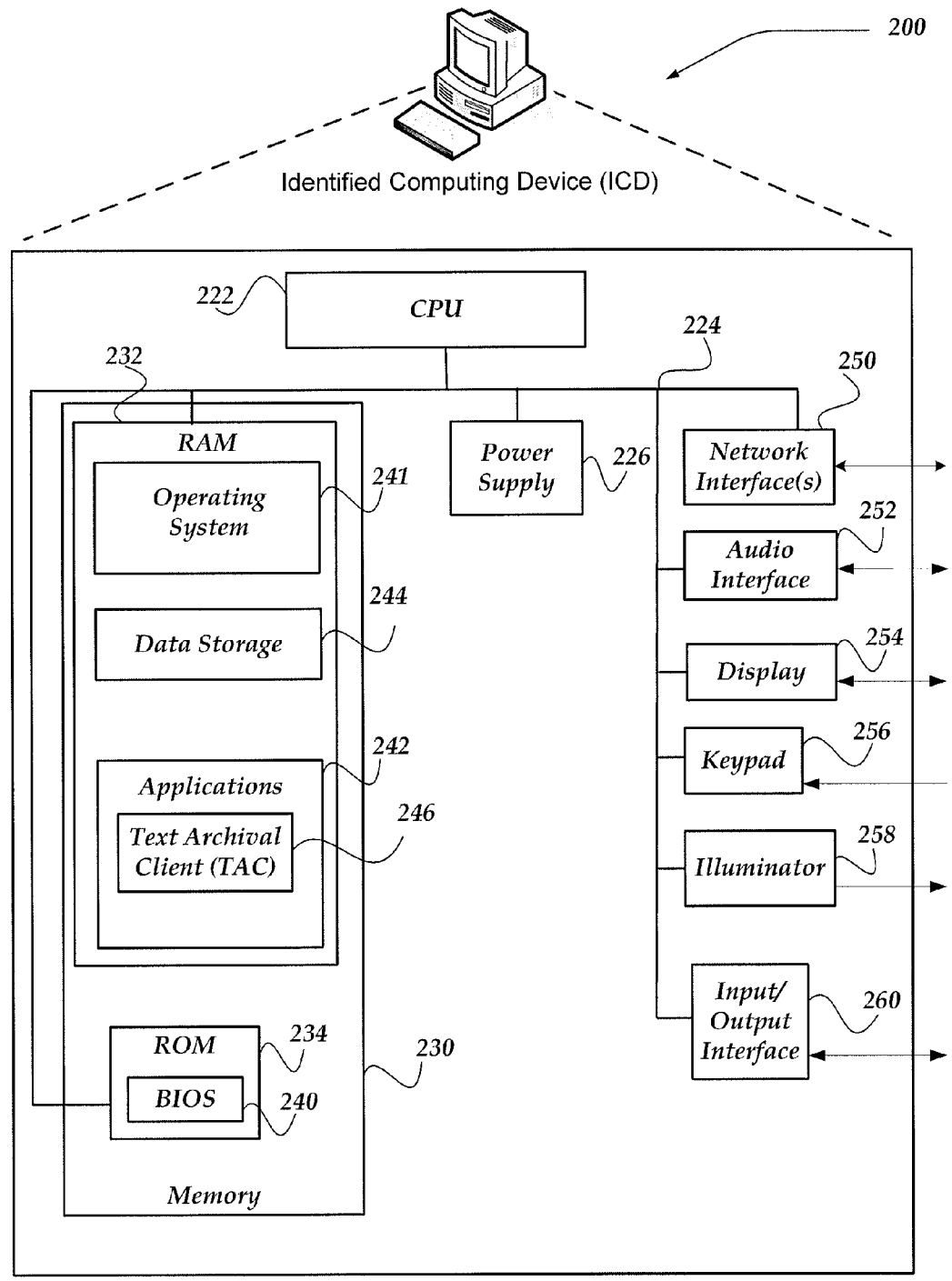
FIG. 2 shows one embodiment of an identified computing device that may be employed in a system implementing the invention.

FIG. 2 shows one embodiment of ICD 200 that may be included in a system implementing the invention. ICD 200 may include many more or less components than those shown in FIG. 2. However, the components shown are sufficient to disclose an illustrative embodiment for practicing the invention. ICD 200 may represent, for example, ICD 101 of FIG. 1. It should be noted that ICD 200 may represent a personal computing device, a specified mobile device, server device, or the like.

As shown in the figure, ICD 200 includes a processing unit (CPU) 222 in communication with a mass memory 230 via a bus 224. ICD 200 also includes a power supply 226, one or more network interfaces 250, an audio interface 252, a display 254, a keypad 256, an illuminator 258, and an input/output interface 260. Power supply 226 provides power to ICD 200. A rechargeable or non-rechargeable battery may be used to provide power. The power may also be provided by an external power source, such as an AC adapter or a powered docking cradle that supplements and/or recharges a battery.

ICD 200 may optionally communicate with a base station (not shown), or directly with another computing device. Network interface 250 includes circuitry for coupling ICD 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wired or wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

ICD 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like.

Mass memory 230 includes a RAM 232, a ROM 234, and other storage means. For example, although not shown, mass memory may also include a disk drive, or the like. Mass memory 230 illustrates another example of computer storage media for storage of information such as computer readable instructions, data structures, program modules or other data. Mass memory 230 stores a basic input/output system ("BIOS") 240 for controlling low-level operation of ICD 200. The mass memory also stores an operating system 241 for controlling the operation of ICD 200. It will be appreciated that this component may include a general purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Memory 230 further includes one or more data storage 244, which can be utilized by ICD 200 to store, among other things, applications 242 and/or other data. For example, data storage 244 may also be employed to store information that describes various capabilities of ICD 200. The information may then be provided to another device based on any of a variety of events, including being sent as part of a header during a communication, sent upon request, or the like. Data storage 244 may also be employed to store messages, an address book, phone list, task lists, or the like. Moreover, in one embodiment, data storage 244 may also be employed to store a text message network-based archive outbox, and/or inbox. In one embodiment, data storage 244 may be configured to enable archived text messages to be retrieved and/or displayed through display 254 as threaded text conversations.

Applications 242 may include computer executable instructions which, when executed by ICD 200, transmit, receive, and/or otherwise process messages (e.g., MMS, IM, EMS, email, and/or other messages), audio, video, and enable telecommunication with another user of another client device. Other examples of application programs include calendars, browsers, email clients, IM applications, VOIP applications, contact managers, task managers, transcoders, database programs, word processing programs, security applications, spreadsheet programs, games, search programs, and so forth. One example of an application shown in FIG. 2 is Text Archival Client (TAC) 246.

TAC 246 enables a user to receive and/or send text messages to another computing device. Text client 246 may also allow the user to compose a text response message, and to send the text response message over a network. Text client 246 may operate to manage SMS text messages, MMS messages, EMS messages, or the like. Moreover, in one embodiment, TAC 246 may receive text messages in a text message archive inbox or outbox, wherein at least some of the text messages may be related to each other through a threaded conversation. As such, TAC 246 may be configured to enable a display of text messages in a threaded conversation format.

Illustrative Server Environment

Figure 3:
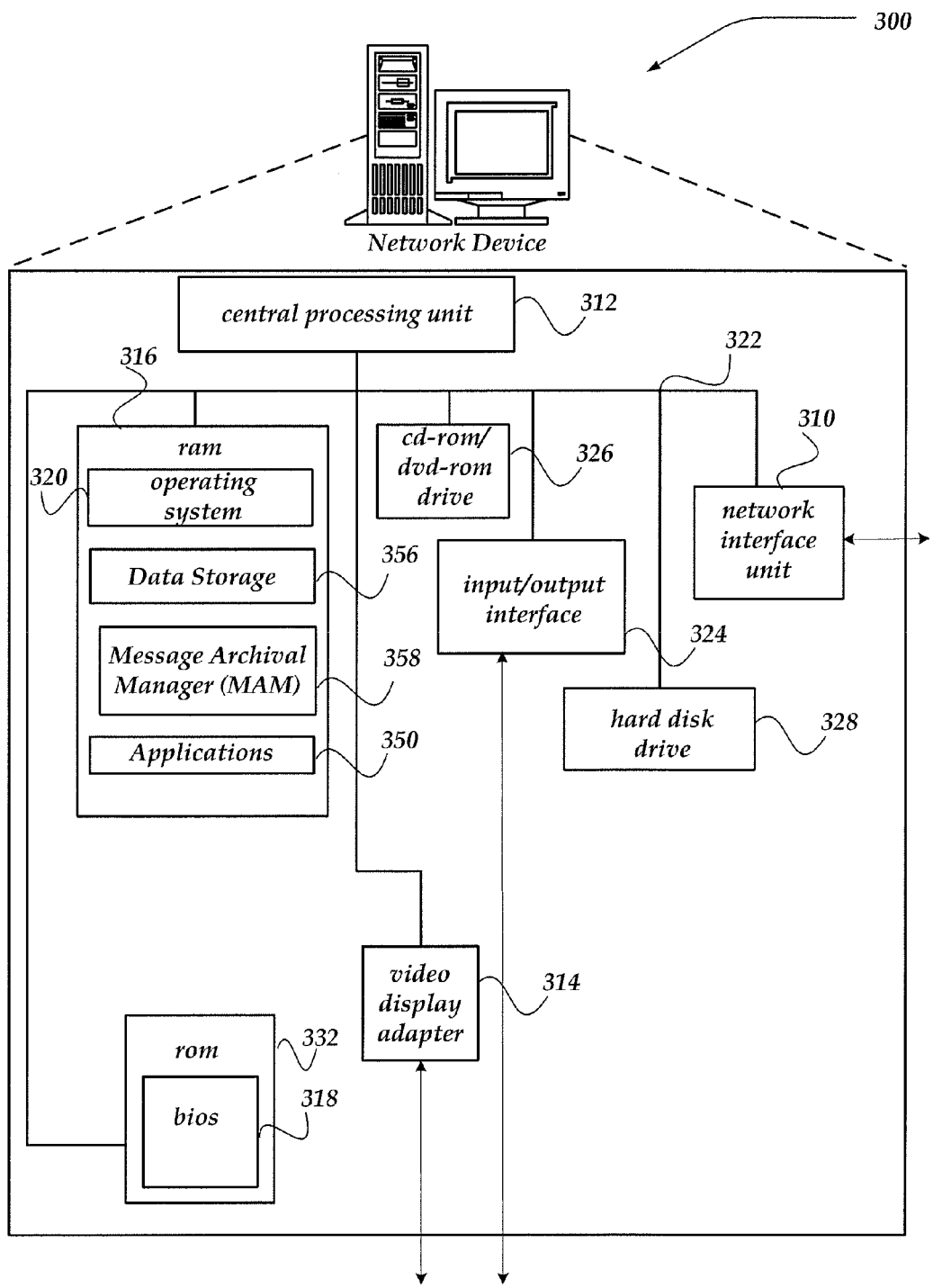
FIG. 3 shows one embodiment of a server device that may be employed in a system.

FIG. 3 shows one embodiment of a network device, according to one embodiment of the invention. Network device 300 may include many more components than those shown. The components shown, however, are sufficient to disclose an illustrative embodiment for practicing the invention. Network device 300 may represent, for example, MAS 106 of FIG. 1.

Network device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of computer-readable media, namely computer storage media. Computer storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. In one embodiment, mass memory may include data storage 356 that is configured to store various information, including user registration information useable in determining whether a user has requested text message archiving, or the like. One or more applications 350 are loaded into mass memory and run on operating system 320. Examples of application programs may include transcoders, schedulers, calendars, database programs, word processing programs, HTTP programs, customizable user interface programs, IPSec applications, encryption programs, security programs, VPN programs, content delivery programs, account management, text messaging servers, web servers, or so forth. Application programs may also include Message Archival Manager (MAM) 358.

MAM 358 is configured to operate as a text messaging carrier's interface component for intercepting, forwarding, and otherwise managing text messages between network devices over a network. MAM 358 may, in one embodiment, be configured to selectively enable archiving of received text messages based on whether a user has so requested archival.

MAM 358 may receive a request from a user to archive messages. In one embodiment, the request may include identification of a location in which the messages are to be archived. For example, in one embodiment, the user might provide a network address of an identified computing device such as a URL, IP address or the like, a messaging address for the identified computing device, an account identifier, or the like. In one embodiment, the user may specify an inbox and/or outbox folder for which the text messages are to be archived. In one embodiment, the user may further specify a threaded messaging folder where a threaded conversation of received and/or sent text messages may be archived.

When the user requests archival for a first time, the user may provide additional information about the mobile device for which archival of text messages is to be associated. For example, the user might provide a user name, alias, account identifier, a phone number, or other mobile device identifier, or other identifier. The provided information may then be employed by MAM 358 in determining whether a received text message is to be archived.

Information received from the user may then be stored in data storage 356. In one embodiment, the information may be organized such that when a message is received, data storage 356 may be searched based on the mobile device identifier, user account, user name, or other information, received and/or determined from the test message, the messaging protocol, headers, a messaging gateway, mobile device, or the like. Such information may then be used to search data storage 356 to determine if the user has requested archival.

In one embodiment, MAM 358 may receive a text message, and examine data storage 356 to determine whether to archive the text message. If the text message is to be archived, MAM 358 may replicate the text message, and deliver the original text message to its destination over the network. MAM 358 may then deliver to a network-based text message outbox, or inbox, for an identified computing device, such that the text message may then be displayed in a threaded conversation at the identified computing device.

In one embodiment, if MAM 358 is unable to archive the text message at the identified computing device, for any reason, MAM 358 may be configured to store the message in data storage 356. Then, when the identified computing device is accessible, MAM 358 may then provide the test message to the identified computing device. Such situations may arise, for example, when the identified computing device is off of the network, a network failure has occurred, the identified computing device is powered down, failed, or the like, or for any of a variety of other reasons. MAM 358 may employ a process such as described below in conjunction with FIG. 4 to perform at least some of its actions.

Generalized Operation

Figure 4:
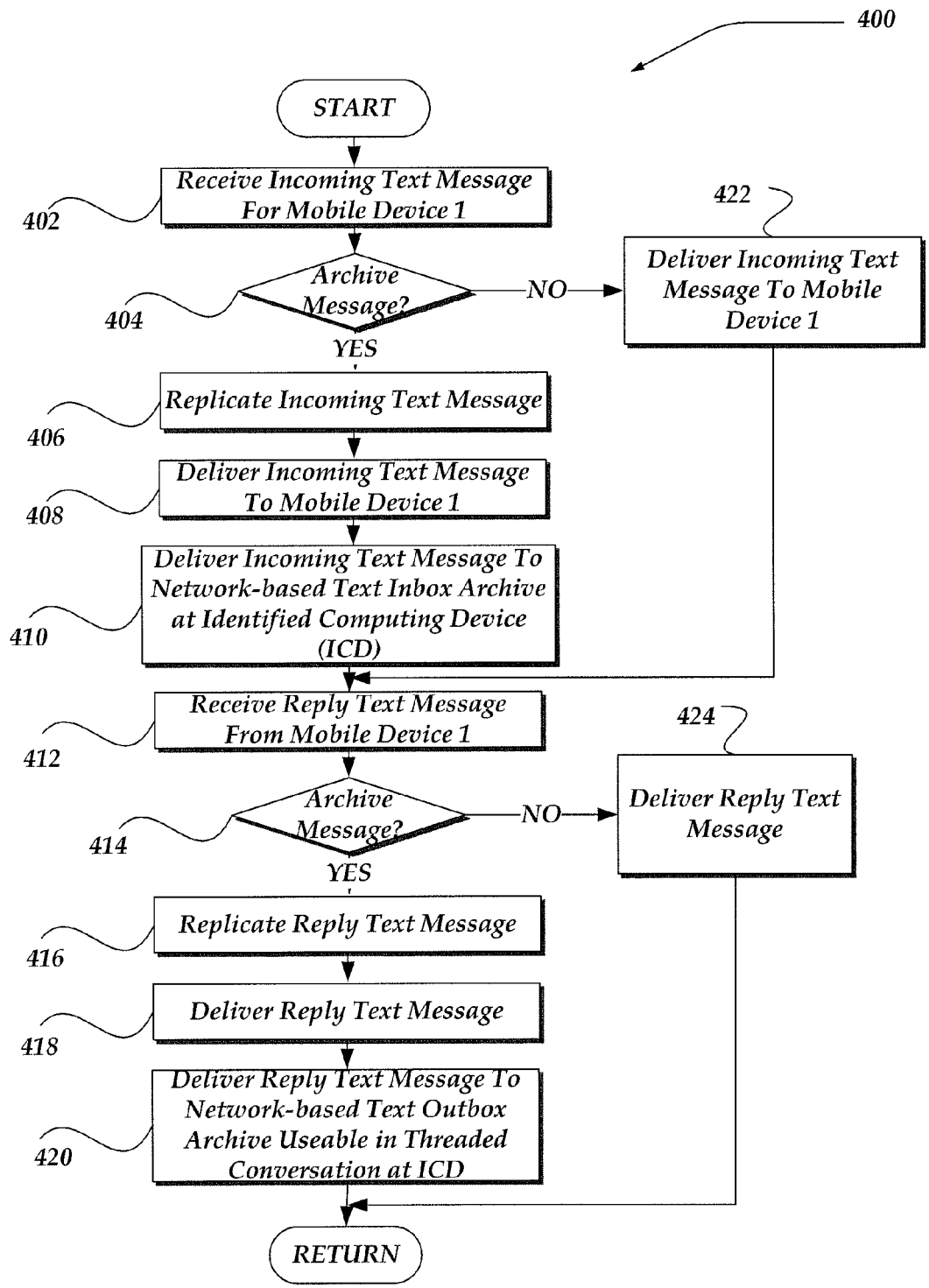
FIG. 4 illustrates a logical flow diagram generally showing one embodiment of a process for network-based message archiving of text threaded conversations from a mobile device onto an identified computer device, in accordance with various embodiments.

The operation of certain aspects of the embodiments will now be described with respect to FIG. 4. FIG. 4 illustrates a logical flow diagram generally showing one embodiment of a process for network-based message archiving of text threaded conversations from a mobile device onto an identified computer device.

It one embodiment, process 400 may related to text communications between mobile device 1, such as mobile devices 102-104 of FIG. 1, and another computing device. The other computing device, may, in one embodiment, be a mobile device; however, the invention is not so constrained. For example, the other computing device may be a personal computer, such as a desktop computer, a server device, or the like.

In one embodiment, process 400 may be implemented within a network device configured as a network text message carrier's network component, such as MAS 106 of FIG. 1, or the like.

In any event, process 400 begins, after a start block, at block 402, where a computing device, such as mobile device 2, or the like, sends a text message to mobile device 1. At block 402, the text message may be intercepted by the text message carrier's network component. Processing moves next to decision block 404 where a determination is made whether mobile device 1 is registered to have text messages archived. In one embodiment, a data store may be examined to look up a user account, phone number, or other address identifier, to determine whether the text message is to be archived.

If the message is not to be archived, processing flows to block 422 where the received incoming message is delivered to mobile device 1. Process 400 next flows to block 412.

Otherwise, if the message is to be archived, processing continues to block 406, where the incoming text message is replicated. Processing continues next to block 408, where the incoming text message is delivered to the mobile device 1. Processing flows next to block 410, where the replicated incoming text message is delivered to a network-based text message inbox for archival. In one embodiment, if the text message can not be delivered, the process may be configured to hold the message, until the message can be delivered. Thus, messages need not be lost.

Process 400 continues next to block 412, where a reply text message is received (intercepted) from mobile device 1. In one embodiment, the reply text message is intercepted by the text message carrier's network component. Processing continues to decision block 414, where a determination is made whether the intercepted text message is to be archived. In one embodiment, the determination may be performed by examining whether the mobile device 1 is registered in a data store, or the like. In any event, if the reply text message is not to be archived, processing flows to block 424. At block 424, the reply text message may be delivered to its destination address.

Alternatively, at decision block 414, if the reply text message is to be archived, processing flows to block 416, where the reply text message may be replicated. Processing continues to block 418, where the reply text message may then be delivered to the destination address. Process 400 continues next to block 420, where the replicate text message may be delivered to a network-based text message outbox archive where it is useable for display in a threaded conversation. In one embodiment, a message header may be modified to make the reply message appear to be from the identified computing device, rather than the mobile device. Processing then returns to a calling process to perform other actions.

It will be understood that each block of the flowchart illustrations discussed above, and combinations of blocks in the flowchart illustrations above, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor, provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A network device for use in managing network communications over a network, comprising:
   a memory component for storing data; and
   a processing component for executing data that enables actions, including:
      receiving from a first computing device, a text message to be sent to a mobile device;
      when the mobile device is identified for text message archiving:
      duplicating the received text message;
      sending the duplicate text message to a messaging archive on an identified computer associated with the mobile device, wherein the duplicate text message is archived as an incoming message within the messaging archive at the identified computer; and
      forwarding the received text message to the mobile device;
      receiving, based on the received text message a response text message from the mobile device to be sent to the first computing device; and
      modifying a header associated with the response text message such that the response text message appears to have been sent by the identified computer at least within the messaging archive.

2. The network device of claim 1, the processing component enables actions, further comprising:
   when the mobile device is identified for text message archiving:
   duplicating the received response text message;
   sending the duplicate response text message to the messaging archive on the identified computer associated with the mobile device, wherein the duplicate response text message is archived as an outgoing message within the messaging archive at the identified computer, such that the incoming message and the outgoing message form an archive of a threaded conversation between the first computing device and the mobile device.

3. The network device of claim 1, wherein the archived incoming message is archived within an inbox archive on the identified computer.

4. The network device of claim 1, the processing component enables actions, further comprising:
   receiving a request from the mobile device to archive text messages;
   receiving an identifier indicating the identified computer to use for archiving of text messages; and
   receiving an identifier associated with the mobile device useable in determining if the mobile device is identified for text message archiving.

5. The network device of claim 1, wherein when the mobile device is identified for text message archiving further comprises employing at least one of a user account, or a mobile device identifier to determine if the mobile device is identified for text message archiving.

6. The network device of claim 1, wherein sending the duplicate response text message further comprises:
   when the identified computer is inaccessible over the network:
      storing the duplicate text message at the network device; and
   when the identified personal computer is available for receiving the duplicate text message, sending the duplicate text message to the identified computer.

7. The network device of claim 1, wherein the text message further comprises at least one of an Instant Messaging (IM) message, Multimedia Messaging Service (MMS) message, or an Enhanced Message Service (EMS) message.

8. A method for use in managing communications over a network, comprising:
   receiving from a first computing device, a text message to be sent to a mobile device;
   when the mobile device is identified for text message archiving:
      duplicating the received text message;
      sending the duplicate text message to a messaging archive on an identified computer other than the mobile device, wherein the duplicate text message is archived as an incoming message within the messaging archive at the identified computer, and the identified computer is identified by a user of the mobile device;
   forwarding the received text message to the mobile device;
   receiving a response text message from the mobile device to be sent to the first computing device;
   when the mobile device is identified for text message archiving;
      duplicating the received response text message;
      sending the duplicate response text message to the messaging archive on the identified computer such that the incoming message and the outgoing message form an archive of a threaded conversation between the first computing device and the mobile device within the messaging archive at the identified computer; and
      forwarding the response text message to the first computing device; and
      modifying a header associated with the response text message such that the response text message appears to have been sent by the identified computer at least within the messaging archive.

9. The method of claim 8, wherein the text message further comprises at least one of an Instant Messaging (IM) message, Multimedia Messaging Service (MMS) message, or an Enhanced Message Service (EMS) message.

10. The method of claim 9, wherein when the mobile device is identified, further comprises determining when at least one of a user account or a mobile device identifier associated with the mobile device or the received text message indicates that the text message is to be archived.

11. The method of claim 8, wherein the identified computer is identified by the user further comprises:
   receiving from the user of the mobile device, an identifier associated with the identified computer.

12. The method of claim 8, wherein the text message further comprises at least one of a Short Message Services (SMS) message, Instant Messaging (IM) message, Multimedia Messaging Service (MMS) message, or an Enhanced Message Service (EMS) message.

13. The method of claim 8, wherein duplicating the received text message is performed by a computing device other that the mobile device or the identified computer.

14. A system for use in managing messages over a network, comprising:
- a plurality of client devices, including at least a first client device and a second client device, wherein each of the plurality of client devices are configured to send and to receive a text message; and
- a messaging service that is configured to perform actions, including;
  - receiving from the first client device a first text message to be sent to the second client device;
  - when the second client device is identified for text message archiving:
    - duplicating the received text message;
    - sending the duplicate text message to a messaging archive on an identified computer associated with the second client device, wherein the duplicate text message is archived as an incoming message for a user of the second client device within the messaging archive at the identified computer; and
  - forwarding the received text message to the second client device;
  - receiving, based on the received text message, a response text message from the second client device to be sent to the first client device; and
  - when the second client device is identified for text message archiving:
    - modifying a header in the response text message to make the response text message appear to the first client device as though the response text message is sent from the identified computer rather than from the second client device;
    - duplicating the modified received response text message;
    - sending the duplicate modified response text message to the messaging archive on the identified computer, wherein the modified duplicate response text message is archived as an outgoing message within the messaging archive at the identified computer, such that the incoming message and the outgoing message farm an archive of a threaded conversation between the first client device and the second client device.

15. The system of claim 14, wherein the duplicate text message is archived as part of a threaded message conversation between at least first client device and second client device.

16. The system of claim 14, wherein at least one of the first client device or the second client device is a mobile device.

17. The system of claim 14, wherein the text message further comprises at least one of an Instant Messaging (IM) message, Multimedia Messaging Service (MMS) message, or an Enhanced Message Service (EMS) message.

\* \* \* \* \*